Feb. 16, 1932.  F. H. BOGART  1,845,226
CHUCK
Filed Oct. 31, 1927  2 Sheets-Sheet 1
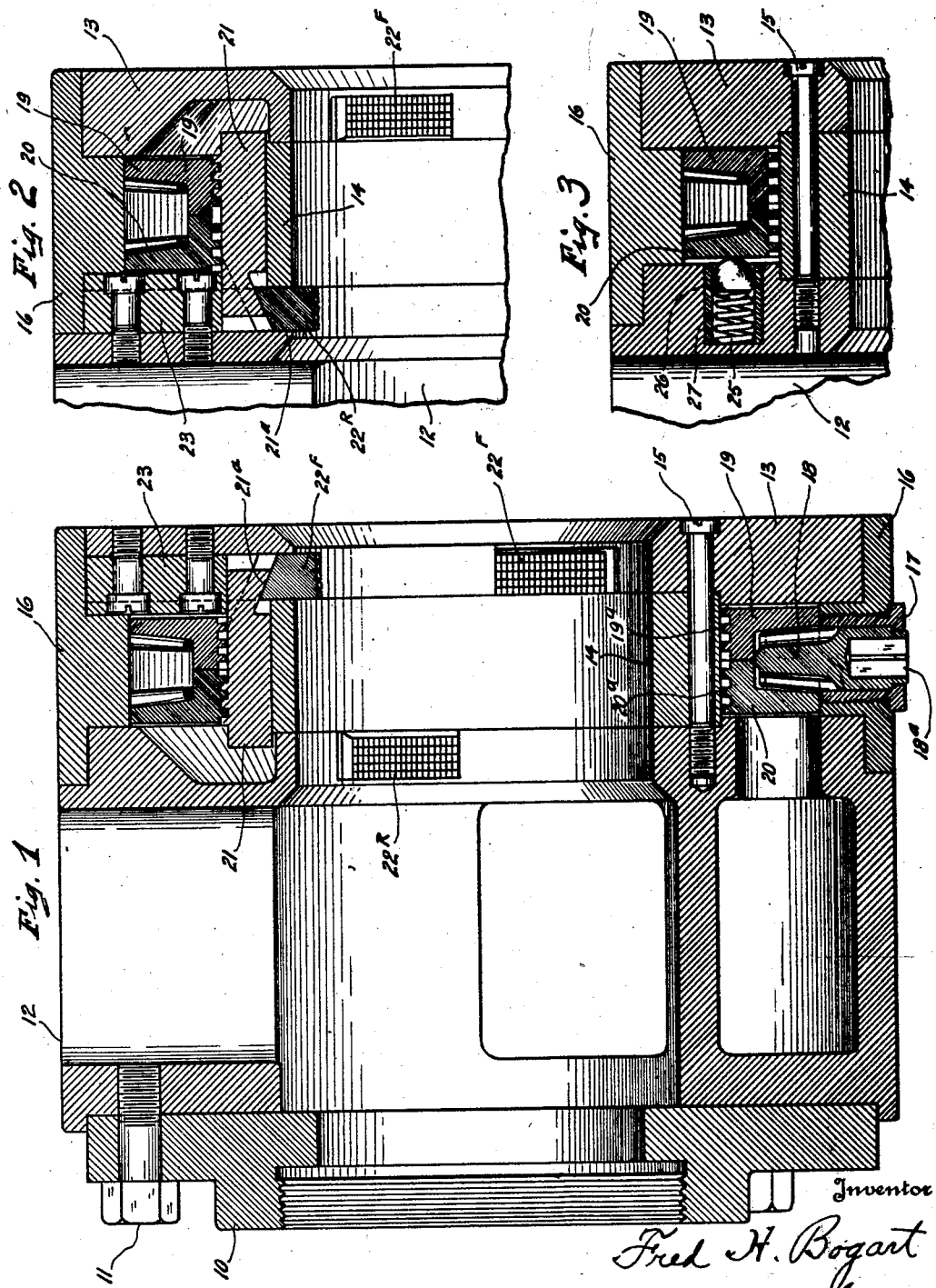
Inventor
Fred H. Bogart
By Kwis Hudson & Kent
Attorneys

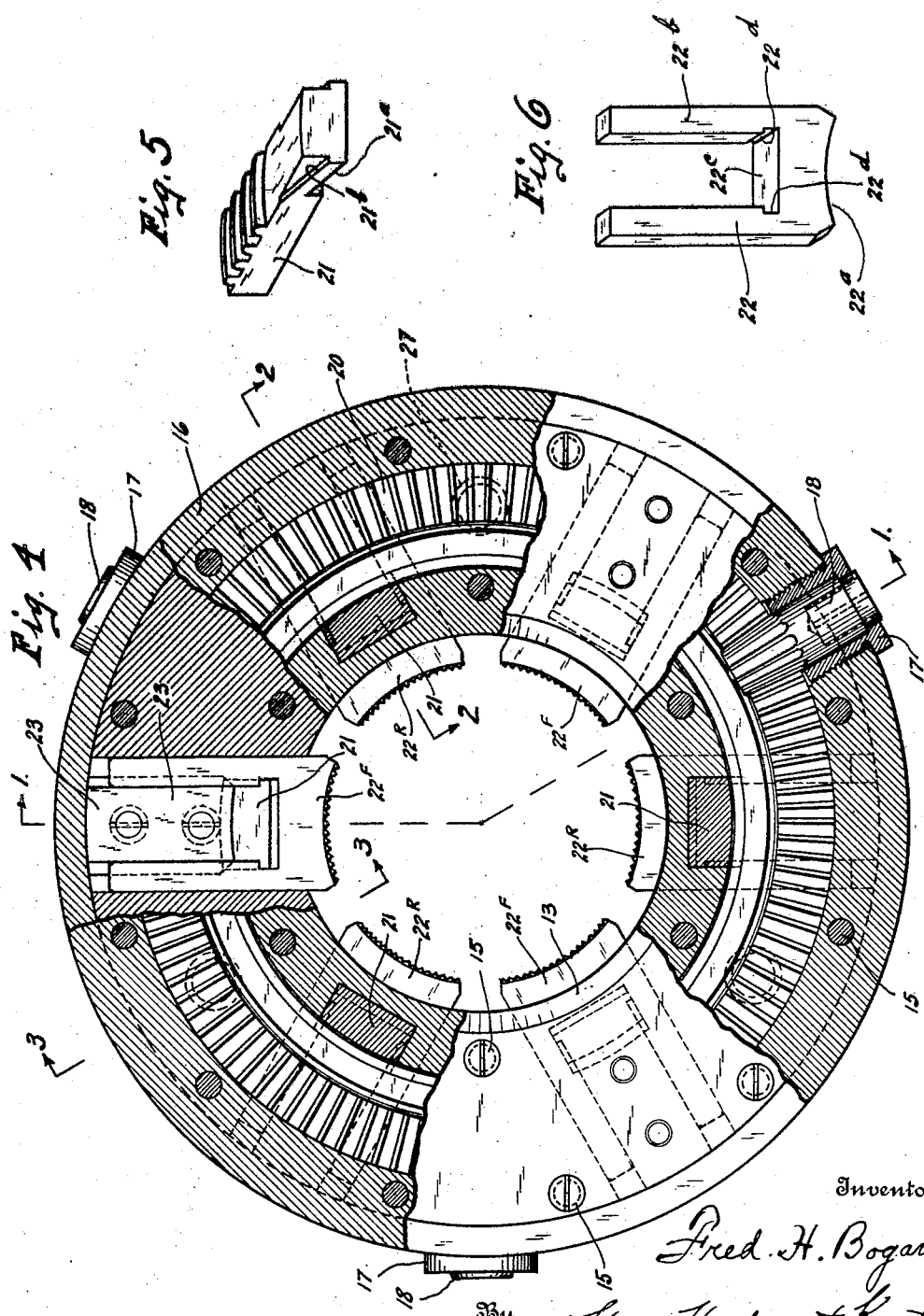

Patented Feb. 16, 1932

1,845,226

UNITED STATES PATENT OFFICE

FRED H. BOGART, OF CLEVELAND HEIGHTS, OHIO, ASSIGNOR TO THE WARNER & SWASEY COMPANY, OF CLEVELAND, OHIO, A CORPORATION OF OHIO

CHUCK

Application filed October 31, 1927. Serial No. 229,896.

This invention relates to chucks for machine tools and has for one of its objects to provide a chuck having two sets of jaws, one located in advance of the other for gripping work pieces with a uniform gripping action regardless of whether the portions of the work piece where engaged by the two sets of jaws are of the same or of different diameters, with provision also whereby the jaws of the forward set are normally retracted to a greater extent than the jaws of the rear set so as to facilitate loading and unloading.

A further object is to provide a chuck of the double scroll type for actuating two sets of jaws and which is more efficient and satisfactory in operation than prior chucks of this general type. More specifically considered, it is the aim of the invention to provide a chuck having two scrolls with improved means for transmitting movement between the scrolls and the jaws so as to permit a reduction in the diameter and in fact a greater degree of compactness than heretofore with chucks of this general type.

The above and other objects are attained by my invention which may be here briefly summarized as consisting in certain novel details of construction and combinations and arrangements of parts which will be described in the specification and set forth in the appended claims.

In the accompanying sheets of drawings wherein I have shown the preferred embodiment of the invention, Figure 1 is a longitudinal sectional view through the improved chuck, the section being taken substantially along the line 1—1 of Fig. 4, Figure 2 is a similar sectional view through a portion of the chuck, the section being taken substantially along the line 2—2 of Fig. 4, so as to show in section a jaw of a different set than that shown in section in Fig. 1, Figure 3 is a sectional view substantially along the line 3—3 of Fig. 4, Figure 4 is a front elevation of the chuck with parts in section, Figure 5 is a perspective view of one of the scroll operated wedges for actuating one of the jaws, and Figure 6 is a perspective view of one of the jaws.

Referring now to the drawings, the chuck includes an adapted 10 which is adapted to be screwed onto the spindle of a machine tool such as a lathe. To this adapter is secured by screws 11 a chuck body 12 which is an annular member hollowed out for the sake of lightness and also to facilitate inspection of the inner end of the work piece held in the chuck. At the front of the chuck is an annular member 13, and between this member and the front of the chuck body 12 is a second annular member 14 of smaller diameter. The two members 13 and 14 are held to the front of the chuck body by screws 15 whereby these parts are at all times held in rigid relation. Surrounding the annular members 13 and 14 and overlapping a portion of the front of the chuck body 12 is a ring 16 with a central rib-like member projecting inwardly between the annular member 13 and the chuck body, this rib-like member surrounding the inner annular member 14.

Mounted in this ring 16 are bushings 17, in this case three in number which support in radial position three slightly beveled pinions 18 whose outer portions are cylindrical and are seated in the bushings and held by shoulders formed at the outer ends thereof against outward radial movement.

Inside of the central rib-like portion of the outer ring 16 and bearing upon the inner annular surface thereof are two scrolls 19 and 20 between which the beveled pinions 18 extend, and which pinions engage so that when any one of the pinions is rotated, as by inserting a wrench in a wrench socket 18a formed in the outer portion of the pinion, the scrolls will be turned in opposite directions. The scrolls are provided on their inner peripheries with threads 19a and 20a. Inside the scrolls there are two sets of axially movable members 21 hereinafter referred to as wedges, which members are adapted to be moved longitudinally of the axis of the chuck in slots formed in the periphery of the inner ring 14, so as to move radially the jaws of the chuck. In this instance there are three of these wedges to each set for the reason that the chuck is provided with two sets of jaws of three each, but the chuck may have a greater or even a smaller number of jaws than herein illustrated, in which event there will be a corresponding number of these wedges 21. However, I have found in practice that a chuck having three jaws in each set, one set located in advance of the other, produces very good results, and, accordingly, that number of jaws is herein illustrated without any intention of confining myself thereto. The jaws may be referred to generally by the reference character 22 which is applied to Fig. 6, the jaws of both sets being the same, but for convenience of description, in Figs. 1, 2 and 4, the front jaws are designated 22f and the rear jaws 22r.

The wedges 21 of one set have on their outer surface threads which engage the threads formed on the rearward scroll 20, as shown in Fig. 1, these being employed for operating the set of front jaws 22f. The wedges 21 of the other set have on their outer surface threads which engage the threads of the forward scrolls 19, these being for the purpose of operating the set of rear jaws 22r.

The front jaws 22f move radially in slots formed in the front annular member 13 and the rear set of jaws 22r move radially in similar slots formed in the forward portion of the chuck body 12, note Fig. 2. By reference to Figs. 4 and 6, it will be noted that each radially movable jaw is substantially U-shaped, being provided with a corrugated or otherwise roughened work engaging inner end 22a and with a pair of outwardly projecting parallel arms 22b, these arms of the jaws having sliding engagement on opposite sides of blocks 23 which serve as thrust resisting members, as will be pointed out below, one set of the blocks being secured centrally in the slots of the front annular member 13, note Figs. 1 and 4, while the blocks for the rear set of jaws are secured centrally in the slots provided for the jaws 22r in the front portion of the chuck body 12.

By reference to Fig. 1 it will be noted that the threads on the wedges which engage the inner scroll 20 are formed on the inner or rearward upper portions of the wedges and that the forward ends of these wedges are provided with wedge-shaped portions having tapered surfaces 21a which slidingly engage tapered surfaces 22c formed on the front set of jaws so that when these particular wedges are moved to the left, as viewed in Fig. 1, they will move the front jaws radially inward. The forward ends of these wedges are provided on their sides with tapered surfaces 21b which are parallel to the first named tapered surfaces 21a. The portions between the tapered surfaces 21a and 21b form the equivalent of keys or ribs which engage in inclined grooves 22d formed in the jaws so that when the particular wedges referred to are moved to the right, as viewed in Fig. 1, they will retract or move the front jaws radially outward.

The wedges for actuating the rear set of jaws are constructed exactly like those for actuating the front set, being simply reversed in position. That is to say, the portions of these wedges which project toward the front of the chuck carry the threads which engage the threads of the front scroll 19, and the portions of the wedges which project toward the rear of the chuck are formed with tapered surfaces the same as the wedges first referred to, so that the rear set of jaws will be moved inward when the wedges of the second set are moved to the right, as viewed in Fig. 2, and are moved radially outward or retracted when these wedges are moved in the opposite direction.

It will be noted that the blocks 23 which are straddled by the arms of the jaws not only serve as guides for the jaws, but the inner ends of these blocks are located directly beneath the wedge-shaped portions of the wedges so as to take the thrust of the jaws, which thrust is transmitted through the wedges. This will be apparent from a consideration of Figs. 1 and 2. The blocks 23 which take the side and radial thrusts of the jaws are practically the only members susceptible to wear and are readily renewable.

It will be seen from the above that when any one of the pinions 18 is rotated the scrolls 19 and 20 will be turned in opposite directions moving one set of wedges to the right and the other set of wedges to the left. This will cause the two sets of jaws to be either moved inwardly or retracted, depending upon the direction in which the pinions are rotated.

By referring particularly to Figs. 1, 2 and 3, it will be observed that the inner or adjacent portions of the scrolls engage each other, and it might be here stated that this engagement takes place at all times for it will be apparent that when work is held in the chuck the action of the rear jaws on the corresponding wedges is to exert an inward or rearward thrust on the forward scroll 19 and that the action of the front jaws on the corresponding wedges is to create a forward thrust on the rear scroll. Likewise, it will be observed by reference to these same figures that the combined width of the two scrolls is substantially less than the width of the groove formed to receive the scrolls between the front annular member 13 and the chuck body, allowing the scrolls to float or move laterally to bring about an equalization of the gripping pressure of the two sets of jaws on the work piece as will be explained. When the jaws are released from the work, the two scrolls are not centrally located in this groove but are pressed forwardly against the front annular member 13 by springs 25 and by balls 26, the balls being pressed forwardly by the springs into engagement with the rear scroll 20. The springs 25 and balls 26 are located in sockets formed in the front face of the chuck body, as indicated in Fig. 3, each spring and its associated ball being preferably received in a hardened bushing 27 which is fitted into the socket. Three sets of springs and balls are preferably employed for this purpose, as indicated by dotted lines in Fig. 4.

By reason of the construction described above when the jaws of the chuck are not gripping a work piece the scrolls are located as indicated in Fig. 3. In consequence, the rear set of jaws will project inwardly somewhat further than the front set of jaws and this arrangement very materially facilitates the loading and unloading of the chuck, as will be apparent.

When a work piece is inserted in the chuck and the jaws are tightened by turning any one of the pinions 18, the jaws of the rear set will engage the work piece first. Thus the continued turning of the front scroll connected to these jaws will cause both scrolls to be moved bodily toward the center of the groove or chamber receiving the scrolls, this being due to the threaded engagement of the forward scroll with the now stationary wedge members. This bodily or lateral movement of both scrolls gives an added movement to the other set of wedge members connected to the front jaws, this resulting in a faster inward movement of the said front jaws until they also come to gripping position, at which time both scrolls become stationary, their position in the groove depending on the diameters of the work piece where gripped by the two sets of jaws.

If the front and rear portions of the work piece where engaged by the front and rear sets of jaws are of the same diameter, when the work piece is tightly gripped both sets of jaws will engage the work piece with the same degree of pressure and the scrolls will stand in the central position shown in Figs. 1 and 2. If, however, the front and rear portions of the work piece are not of the same diameter, the two sets of jaws will still grip the work with the same degree of pressure but the scrolls will come to rest at a position somewhat to the right or left of the mid position. Ordinarily the work pieces held in a chuck are of the same or substantially the same diameter where engaged by the front and rear sets of jaws, but there is at times a variation in the diameter of the two parts of any particular work piece, particularly when the work consists of a forging or casting, and the floating action or lateral play of the scrolls between the front annular member 13 and the front face of the chuck body, which lateral play is indicated by the width of the clearance space shown in Fig. 3 between the rear scroll and the front of the chuck body, is selected with this more or less predetermined variation in diameter in mind. That is to say, this clearance and, therefore, the permissible lateral play of the scrolls in the chuck, is sufficient to cause the chuck to grip a work piece equally at the front and rear jaws regardless of the fact that the diameters of the front and rear portions where gripped by the jaws may vary within the known extent. It will be understood, of course, that inasmuch as the pinions 18 are centrally located with relation to the groove which receives the scrolls, the teeth on the pinion and on the inner faces of the scrolls must be so cut as to permit this lateral movement of the scrolls.

When the scrolls are operated to retract the jaws and release the work, both scrolls of course rotate oppositely with respect to their rotation inclosing the jaws, and as soon as the jaws become free of the work piece the springs 25 come into action and press both scrolls laterally forward to the position indicated in Fig. 3, and when the parts of the chuck come to rest the front set of jaws will have been retracted somewhat further than the rear set.

While I have shown the preferred construction, modifications may be made in details, and I aim in my claims to cover all modifications which do not involve a departure from the spirit and scope of the invention.

Having thus described my invention, I claim:

1. A chuck comprising a member adapted to rotate about an axis having two sets of jaws one in advance of the other, a pair of scrolls rotatable in opposite directions, and members movable in the direction of said axis and arranged between the scrolls and the jaws for transmitting movement from the former to the latter.

2. In a chuck, a rotatable member having two sets of jaws one in advance of the other, a pair of scrolls rotatable in opposite directions for shifting the jaws, and movement transmitting wedge members between the scrolls and jaws.

3. In a chuck, a rotatable member having radially disposed guideways, two sets of jaws in said guideways, one set located in advance of the other, said rotary member also having an annular groove receiving a pair of scrolls, and movement transmitting members separate from and located between the scrolls and the jaws.

4. In a chuck, a rotary member having two sets of jaws one in advance of the other, two rotatable scrolls and two sets of movement transmitting members between the scrolls and the jaws and movable with respect to both the latter, one scroll having engagement with one set of said members which serve to actuate one set of jaws, and the other having engagement with the other set of members which serve to actuate the other set of jaws.

5. In a chuck, a rotary member having two sets of jaws and two floating rotatable scrolls for actuating the jaws, said member having a scroll receiving portion which admits of lateral movement of the scrolls to secure the floating action.

6. In a chuck, a rotary member having two sets of jaws one in advance of the other and having a chamber receiving two scrolls adapted to be rotated in opposite directions to shift the jaws, space being provided in the chamber for lateral movement of the scrolls therein to permit equalized pressure of the two sets of jaws on a work piece.

7. In a chuck, a rotary member having two sets of jaws one in advance of the other and having two scrolls with movement transmitting wedges connecting each scroll to one set of jaws, said scrolls being mounted in the rotary member so as to be capable of both rotary movement and lateral movement, whereby the jaws will be actuated by turning the scrolls and equalized pressure of the jaws will be obtained on the work piece by the lateral movement of the scrolls.

8. In a chuck, a rotary member having two sets of jaws one in advance of the other, two scrolls arranged side by side in said rotary member and having threads on their inner peripheries and two sets of movement transmitting members, each set engaging one set of jaws and each set having its outer portions in threaded engagement with one of the scrolls.

9. In a chuck, a rotary member having radial guideways receiving a pair of jaws, a scroll carried by the rotary member, and wedges having threaded engagement with the scroll and at their ends having two tapered portions engaging correspondingly tapered portions of the jaw.

10. In a chuck, a rotary member having radial guideways receiving a set of jaws, a scroll carried by the rotary member, and adapted to shift the jaws, the guideways having radial thrust resisting members with which the jaws have sliding engagement.

11. In a chuck, a rotary member having guideways receiving a set of radially movable jaws, a scroll for actuating the jaws, wedges engaged by the scroll and having engagement with the jaws, and thrust resisting members located opposite the tapered portions of the wedges to take the thrust transmitted from the jaws to the wedges.

12. In a chuck, a rotary member having guideways for a set of radially movable jaws, thrust resisting members in the guideways, a scroll, and wedges extending from the scroll into engagement with the jaws and adapted to transmit radial pressure from the jaws to said thrust resisting members.

13. In a chuck, a rotary member having two sets of jaws one in advance of the other, a pair of scrolls for shifting the jaws, movement transmitting members separate from the scrolls and jaws connecting each scroll to one set of jaws, and a pinion engaging the scrolls for simultaneously turning them.

14. In a chuck, a rotary member having two sets of jaws one in advance of the other and having a chamber therein containing two scrolls adapted to be turned and having a space permitting the scrolls to move laterally in said chamber, movement transmitting members between each scroll and one set of jaws, said rotary member having a part surrounding the scrolls and provided with one or more pinions extending between and engaging the scrolls.

15. A chuck comprising a rotary member having two sets of jaws one in advance of the other, means for actuating the jaws to engage and release a work piece, and means including a member common to both sets of jaws for actuating said jaws so that when the jaws are released from the work piece one set of jaws projects inwardly further than the other set.

16. In a chuck, a rotary member having two sets of jaws, one in advance of the other, and means for moving the jaws inwardly and outwardly and means for causing the jaws to engage a work piece with equalized pressure including an actuating member common to both sets of jaws, one set of jaws projecting inwardly further than the other set when the jaws are disengaged from the work piece.

17. In a chuck, a rotary member having two sets of jaws, and means for actuating the jaws comprising two rotatable scrolls each operatively connected with one set of jaws, the rotary member having a scroll receiving space which permits them to have a lateral floating action in the rotary member to cause an equalized pressure of the jaws on the work piece.

18. In a chuck, a rotary member having two sets of jaws, means comprising a pair of scrolls each operatively connected with one set of jaws and a common actuating member therefor to move them inwardly and outwardly, and means for causing the scrolls to be normally positioned so that one set of jaws projects inwardly beyond the other when not engaging a work piece.

19. In a chuck, a rotary member having two sets of jaws, and having an annular portion receiving a pair of scrolls for actuating the jaws, each scroll having an operative connection with one set of jaws, and means acting on the scrolls to move them laterally into a non-central position in said annular portion when the jaws are in non-gripping position.

In testimony whereof I hereunto affix my signature.

FRED H. BOGART.